(12) United States Patent
Suzuki et al.

(10) Patent No.: US 12,436,414 B2
(45) Date of Patent: Oct. 7, 2025

(54) OPTICAL PHASE MODULATOR

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Taku Suzuki, Nisshin (JP); Tatsuya Yamashita, Nisshin (JP); Naoya Take, Nisshin (JP); Masashige Sato, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 403 days.

(21) Appl. No.: 18/192,791

(22) Filed: Mar. 30, 2023

(65) Prior Publication Data

US 2023/0324723 A1    Oct. 12, 2023

(30) Foreign Application Priority Data

Apr. 12, 2022  (JP) .................................. 2022-065866
Feb. 15, 2023  (JP) .................................. 2023-021801

(51) Int. Cl.
  *G02F 1/015*   (2006.01)
  *G02F 1/025*   (2006.01)

(52) U.S. Cl.
  CPC ............ *G02F 1/0154* (2021.01); *G02F 1/025* (2013.01); *G02F 2203/50* (2013.01)

(58) Field of Classification Search
  CPC ..... G02F 1/0154; G02F 1/025; G02F 2203/50
  See application file for complete search history.

(56) References Cited

U.S. PATENT DOCUMENTS

| 10,216,016 | B2  | 2/2019  | Lee et al. |
| 2011/0176762 | A1 | 7/2011  | Fujikata et al. |
| 2015/0293384 | A1 | 10/2015 | Ogawa et al. |
| 2017/0315387 | A1 | 11/2017 | Watts et al. |
| 2019/0196231 | A1 | 6/2019  | Kawai et al. |
| 2020/0124883 | A1* | 4/2020 | Delisle-Simard ....... G02F 1/025 |
| 2020/0192131 | A1 | 6/2020  | Delisle-Simard et al. |
| 2022/0260864 | A1 | 8/2022  | Delisle-Simard et al. |

* cited by examiner

*Primary Examiner* — Charles S Chang
(74) *Attorney, Agent, or Firm* — Posz Law Group, PLC

(57) ABSTRACT

An optical phase modulator includes a rib part extending in an extending direction. The rib part includes an N-type first rib portion and a P-type second rib portion arranged in a width direction to have a PN junction therebetween along the extending direction. An N-type first slab portion is connected to the first rib portion and a P-type second slab portion is connected to the second rib portion to provide a PN structure with the rib part in a cross-section having a normal direction along the extending direction. A P-type third slab portion is connected to the first rib portion and an N-type fourth slab portion is connected to the second rib portion to have a PNPN structure with the rib part in a cross-section having a normal direction along the extending direction. The PN structure and the PNPN structure are alternately disposed in the extending direction.

7 Claims, 7 Drawing Sheets

OPTICAL PHASE MODULATOR

CROSS REFERENCE TO RELATED APPLICATION

The present application claims the benefit of priority from Japanese Patent Applications No. 2022-065866 filed on Apr. 12, 2022, and No. 2023-021801 filed on Feb. 15, 2023. The entire disclosures of the above applications are incorporated herein by reference.

TECHNICAL FIELD

The present disclosure relates to an optical phase modulator having a rib part.

BACKGROUND

Optical phase modulators having PN junction have been proposed. For example, there is a proposed optical phase modulator including an optical waveguide having a rib part extending in one direction as an extending direction, and a first slab portion and a second slab portion which are disposed on both sides of the rib part. The first slab portion and the second slab portion are connected to the rib part, and are thinner than the rib part.

SUMMARY

The present disclosure describes an optical phase modulator. An optical phase modulator according to an aspect of the present disclosure includes a rib part extending in an extending direction, and first to fourth slab portions connected to the rib part and having smaller thicknesses than the rib part. The rib part includes a first rib portion of an N-type, and a second rib portion of a P-type. The first rib portion and the second rib portion are arranged in a width direction that intersects the extending direction and a thickness direction of the rib part, and provide a PN junction therebetween along the extending direction. The first slab portion is the N-type. The first slab portion is disposed opposite to the second rib portion with respect to the first rib portion, and is connected to the first rib portion. The second slab portion is the P-type. The second slab portion is disposed opposite to the first rib portion with respect to the second rib portion and is connected to the second rib portion. The third slab portion is the P-type. The third slab portion is disposed opposite to the second rib portion with respect to the first rib portion and is connected to the first rib portion. The fourth slab portion is the N-type. The fourth slab portion is disposed opposite to the first rib portion with respect to the second rib portion and is connected to the second rib portion. The rib part, the first slab portion and the second slab portion provide a PN structure in a cross-section having a normal direction along the extending direction. The rib part, the third slab portion and the fourth slab portion provide a PNPN structure in a cross-section having a normal direction along the extending direction. The PN structure and the PNPN structure are alternately arranged in the extending direction.

BRIEF DESCRIPTION OF THE DRAWINGS

Objects, features, and advantages of the present disclosure will become more apparent from the following detailed description made with reference to the accompanying drawings, in which.

DETAILED DESCRIPTION

To begin with, a relevant technology will be described only for understanding the embodiments of the present disclosure.

For example, there is known an optical phase modulator including an optical waveguide having a rib part extending in one direction as an extending direction, and a first slab portion and a second slab portion which are disposed on both sides of the rib part. The first slab portion and the second slab portion are connected to the rib part, and are thinner than the rib part.

The rib part includes a first rib portion of an N-type and a second rib portion of an N-type, and the first rib portion and the second rib portion are arranged in a width direction, which is a direction intersecting the extending direction and the thickness direction. The first rib portions and the second rib portions are periodically arranged along the extending direction. Further, the second rib portion is arranged to extend in between the first rib portions adjacent to each other in the extending direction. Similarly, the first rib portion is arranged to extend in between the second rib portions adjacent to each other in the extending direction. That is, in the optical phase modulator, the rib part is configured such that the first rib portions and the second rib portions, which have substantially L-shapes as planar shapes, are engaged with each other. The optical phase modulator is thus configured to have a PN junction in a direction intersecting the extending direction.

Hereinafter, a part of the first rib portion that is disposed between the adjacent second rib portions in the extending direction is referred to as a first connection portion, and a part of the first rib portion that extends in the extending direction is referred to as a first main portion. Similarly, a part of the second rib portion that is disposed between the adjacent first rib portions in the extending direction is referred to as a second connection portion, and a part of the second rib portion that extends in the extending direction is referred to as a second main portion. That is, in the rib part, the first main portions and the second connection portions are arranged alternately in the extending direction, and the second main portions and the first connection portions are arranged alternately in the extending direction.

The first slab portion is a P-type and is connected to the first main portion and the second connection portion. Therefore, the second main portion is connected to the first slab portion via the second connection portion. Further, since the first slab portion is connected to the first main portion, a PN junction is formed between the first rib portion (that is, the first main portion) and the first slab portion.

The second slab portion is an N-type and is connected to the second main portion and the first connection portion. Therefore, the first main portion is connected to the second slab portion via the first connection portion. Since the second slab portion is connected to the second main portion, a PN junction is formed between the second rib portion (that is, the second main portion) and the second slab portion.

In such an optical phase modulator, in addition to the PN junction in the rib portion, the PN junction is also formed between the first rib portion and the first slab portion and between the second rib portion and the second slab portion. Therefore, when a reverse bias voltage is applied to the PN junction, a region where the depletion layer expands can be increased, and it is expected that the effective refractive index of light can be increased.

In the optical phase modulator described above, when the reverse bias voltage is applied to the PN junction, the carriers of the first connection portion and the second connection portion may be completely discharged first. In this case, in the optical phase modulator described above, it is difficult to apply the reverse bias voltage to the first main portion and the second main portion. Thus, there is a possibility that the carriers of the first main portion and the second main portion cannot be sufficiently discharged. Therefore, in the optical phase modulator described above, it is conceivable to have a configuration in which the carriers of the first connection portion and the second connection portion are not completely discharged first when the reverse bias voltage is applied to the PN junction. However, in the case where the carriers of the first connection portion and the second connection portion remain when the reverse bias voltage is applied to the PN junction, light is absorbed by the remaining carriers, and thus modulation loss increases.

The present disclosure provides an optical phase modulator capable of suppressing a decrease in the effective refractive index of light while suppressing an increase in modulation loss.

In an embodiment of the present disclosure, an optical phase modulator includes a rib part extending in an extending direction, and first to fourth slab portions connected to the rib part and having smaller thicknesses than the rib part. The rib part includes a first rib portion of an N-type, and a second rib portion of a P-type. The first rib portion and the second rib portion are arranged in a width direction that intersects the extending direction and a thickness direction of the rib part, and provide a PN junction therebetween along the extending direction. The first slab portion is the N-type. The first slab portion is disposed opposite to the second rib portion with respect to the first rib portion in the width direction, and is connected to the first rib portion. The second slab portion is the P-type. The second slab portion is disposed opposite to the first rib portion with respect to the second rib portion in the width direction, and is connected to the second rib portion. The third slab portion is the P-type. The third slab portion is disposed opposite to the second rib portion with respect to the first rib portion in the width direction, and is connected to the first rib portion. The fourth slab portion is the N-type. The fourth slab portion is disposed opposite to the first rib portion with respect to the second rib portion in the width direction, and is connected to the second rib portion. The rib part, the first slab portion and the second slab portion provide a PN structure in a cross-section having a normal direction along the extending direction. The rib part, the third slab portion and the fourth slab portion provide a PNPN structure in a cross-section having a normal direction along the extending direction. The PN structure and the PNPN structure are alternately arranged in the extending direction.

In such an optical phase modulator, the section forming the PN junction and the section forming the PNPN junction are alternately and repeatedly arranged in the extending direction. When a reverse bias voltage is applied, a depletion layer expands at a PN junction between the first rib portion and the second rib portion, at a PN junction between the first rib portion and the third slab portion, and at a PN junction between the second rib portion and the fourth slab portion. Therefore, it is possible to suppress a decrease in the effective refractive index of light.

The first rib portion is electrically connected to the first slab portion disposed on a side opposite to the second rib portion across the first rib portion. The second rib portion is electrically connected to the second slab portion disposed on a side opposite to the first rib portion across the second rib portion. Further, the optical phase modulator does not have the PN junction intersecting the extending direction within the rib part. Therefore, it is possible to suppress an increase in modulation loss due to the remaining carriers.

Hereinafter, embodiments of the present disclosure will be described with reference to the drawings. In the following descriptions of the embodiments, the same or equivalent parts are denoted by the same reference numerals.

First Embodiment

A first embodiment will be described with reference to FIGS. 1 to 3. An optical phase modulator of the present embodiment is preferably used in a communication device for an optical fiber or the like.

Figure 1:
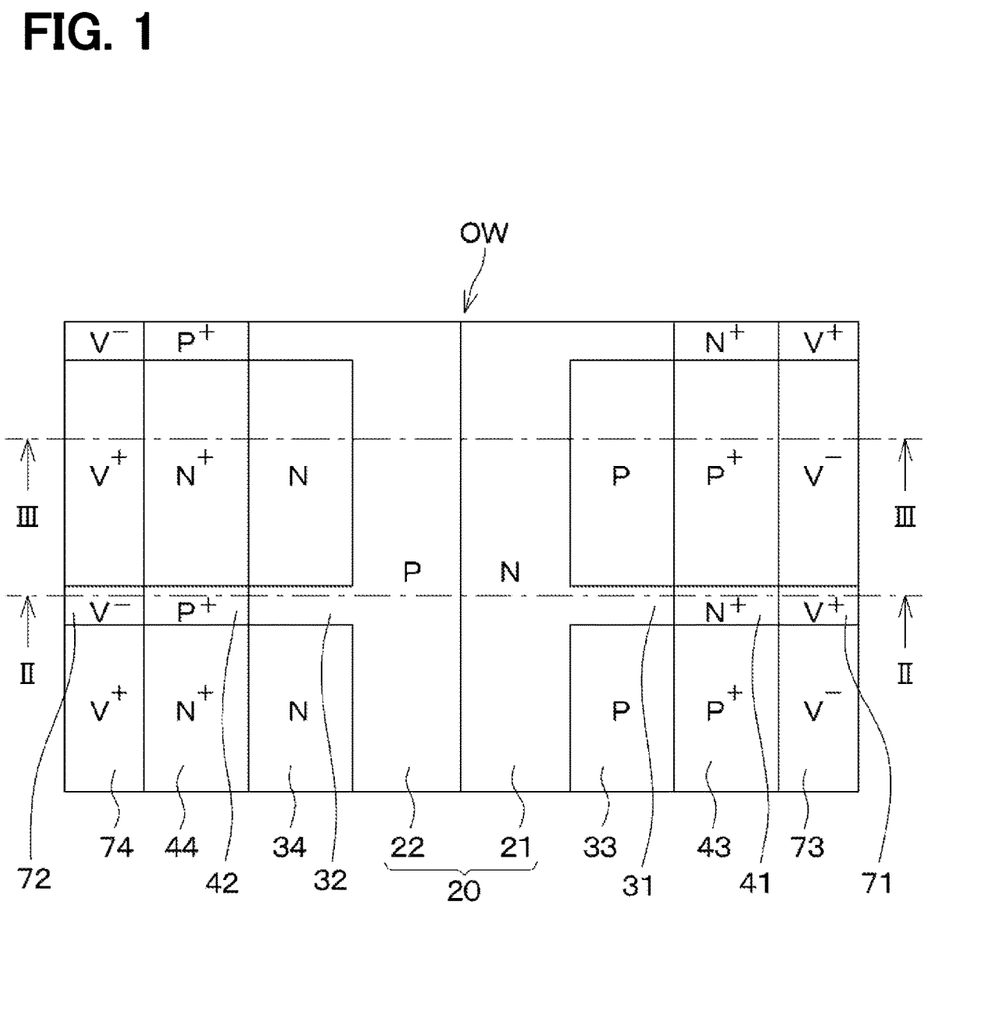
FIG. 1 is a plan view of an optical phase modulator according to a first embodiment.
Figure 2:
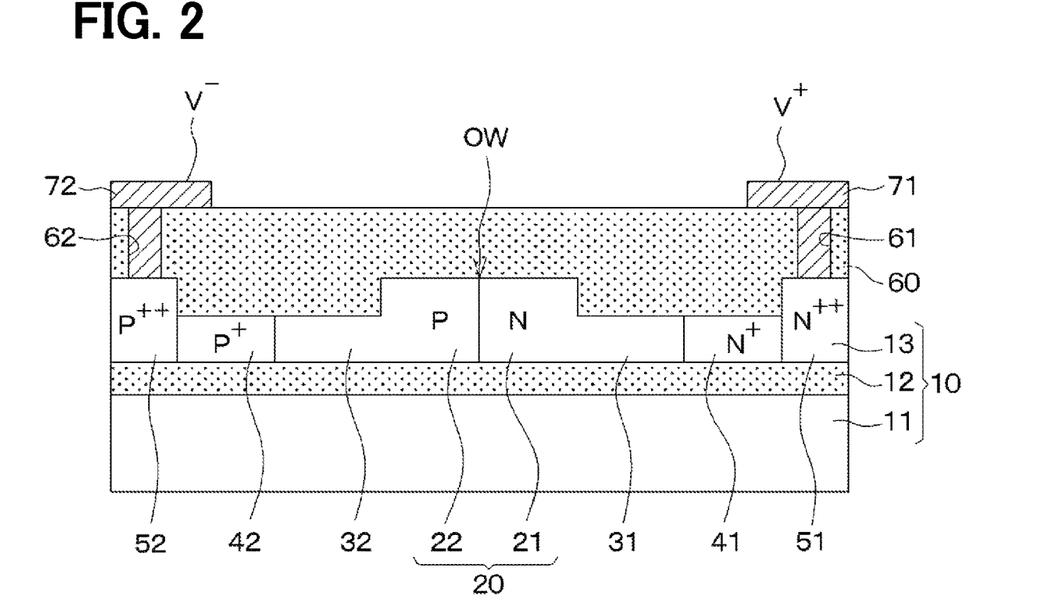
FIG. 2 is a cross-sectional view of the optical phase modulator taken along a line II-II in FIG. 1.
Figure 3:
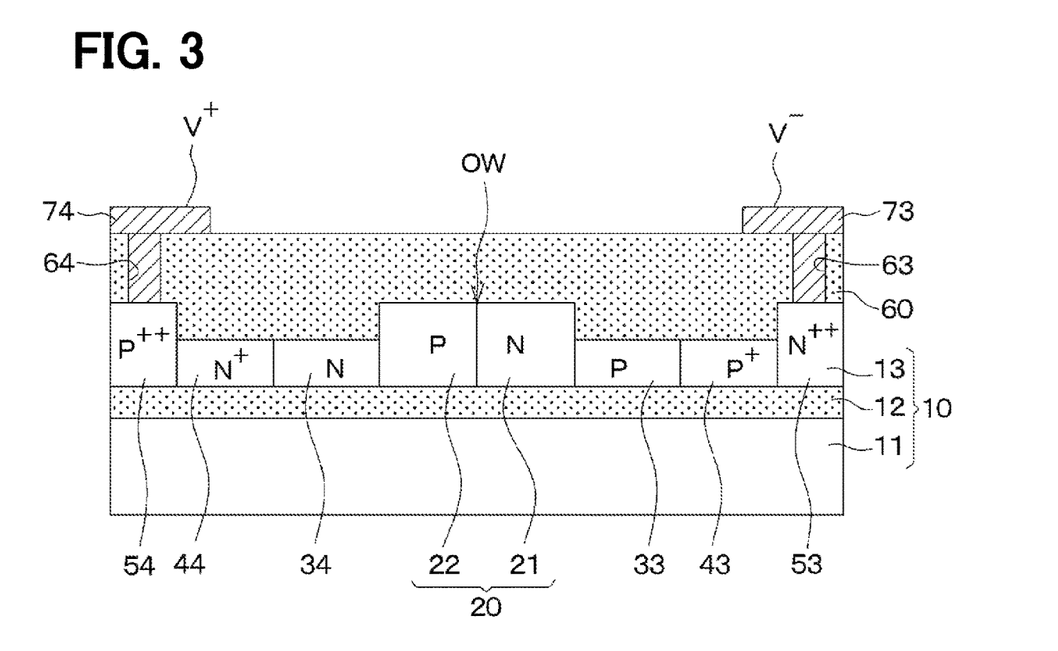
FIG. 3 is a cross-sectional view of the optical phase modulator taken along a line III-III in FIG. 1.

As shown in FIGS. 1 to 3, the optical phase modulator of the present embodiment is configured using a semiconductor substrate 10. The semiconductor substrate 10 is a silicon on insulator (SOI) substrate in which a support substrate 11, an insulating film 12, and an active layer 13 are stacked. In the present embodiment, the support substrate 11 is made of silicon or the like, the insulating film 12 is made of an oxide film or the like, and the active layer 13 is made of silicon or the like. Hereinafter, a direction normal to the surface of the semiconductor substrate 10, that is, a direction normal to a planar direction of the semiconductor substrate 10 is referred to as a thickness direction. Further, a direction intersecting the thickness direction and being parallel to the planar direction of the semiconductor substrate 10 is referred to as a width direction. The width direction may be orthogonal to the thickness direction. In other words, the direction normal to the planar direction of the semiconductor substrate 10 is a direction along a stacking direction of the support substrate 11, the insulating film 12, and the active layer 13. In FIG. 1, illustration of an interlayer insulating film 60, which will be described later, is omitted.

The active layer 13 includes a rib part 20 doped with impurities, a first slab portion 31, a second slab portion 32, a third slab portion 33, and a fourth slab portion 34. The active layer 13 further includes a first connection portion 41, a second connection portion 42, a third connection portion 43, a fourth connection portion 44, a first contact portion 51, a second contact portion 52, a third contact portion 53, and a fourth contact portion 54.

Specifically, the rib part 20 extends in a direction along the planar direction of the semiconductor substrate 10. The direction along which the rib part 20 extends is simply referred to as an extending direction. For example, the extending direction corresponds to an up and down direction in FIG. 1. The rib part 20 has an N-type first rib portion 21 and a P-type second rib portion 22. The first rib portion 21 and the second rib portion 22 are arranged in the width direction of the rib part 20, and a PN junction is formed between the first rib portion 21 and the second rib portion 22. The first rib portion 21 and the second rib portion 22 extend in the extending direction without being divided. In the present embodiment, the first rib portion 21 and the second rib portion 22 have substantially the same impurity concentration.

The first slab portion 31 is an N-type. The first slab portion 31 is disposed opposite to the second rib portion 22 with respect to the first rib portion 21, and is connected to the first rib portion 21. The first slab portion 31 has the same impurity concentration as the first rib portion 21. The second slab portion 32 is a P-type. The second slab portion 32 is disposed opposite to the first rib portion 21 with respect to the second rib portion 2, and is connected to the second rib portion 22. The second slab portion 32 has the same impurity concentration as the second rib portion 22. The first slab portion 31 and the second slab portion 32 are periodically arranged in the extending direction. That is, the plurality of first slab portions 31 and the plurality of second slab portions 32 are disposed in a state of being separated from each other in the extending direction. In other words, the plurality of first slab portions 31 and the plurality of second slab portions 32 are disposed at intervals in the extending direction.

In the present embodiment, the first rib portion 21 and the first slab portion 31 are disposed symmetrically with the second rib portion 22 and the second slab portion 32 with respect to a boundary surface between the first rib portion 21 and the second rib portion 22, that is, a PN junction surface of the rib part 20.

The third slab portion 33 is a P-type. The third slab portion 33 is disposed opposite to the second rib portion 22 with respect to the first rib portion 21, and is connected to the first rib portion 21. Further, the third slab portion 33 is disposed between the first slab portions 31 which are adjacent in the extending direction. The third slab portion 33 has the same impurity concentration as the second rib portion 22.

The fourth slab portion 34 is an N-type. The fourth slab portion 34 is disposed opposite to the first rib portion 21 with respect to the second rib portion 22, and is connected to the second rib portion 22. Further, the fourth slab portion 34 is disposed between the second slab portions 32 which are adjacent in the extending direction. The fourth slab portion 34 has the same impurity concentration as the first rib portion 21.

In the present embodiment, the third slab portion 33 and the fourth slab portion 34 are disposed symmetrically with respect to the boundary surface between the first rib portion 21 and the second rib portion 22. In the present embodiment, the lengths of the third slab portion 33 and the fourth slab portion 34 in the extending direction are larger than those of the first slab portion 31 and the second slab portion 32.

Further, the thickness of each of the first to fourth slab portions 31 to 34 is smaller than the thickness of the rib part 20.

In the present embodiment, the rib part 20 and the first to fourth slab portions 31 to 34 are defined as an optical waveguide OW, and the optical waveguide OW is configured as follows. The optical waveguide OW has a configuration in which a section having the PN junction and a section having a PNPN junction are alternately and repeatedly arranged in the extending direction, the sections being defined in cross-sections having a normal direction along the extending direction, that is, the cross-sections being defined orthogonal to the extending direction. The rib part 20 does not have a connection portion, within the first rib portion 21, that crosses the first rib portion 21 and connects to the second rib portion 22. Also, the rib part 20 does not have a connection portion, within the second rib portion 22, that crosses the second rib portion 22 and connects to the first rib portion 21. That is, the rib part 20 does not have the connection portion that extends across the first rib portion 21 in a direction intersecting the extending direction and connects to the second rib portion 22 in the first rib portion 21, and the connection portion that extends across the second rib portion 22 in the direction intersecting the extending direction and connects to the first rib portion 21 in the second rib portion 22. In other words, a PN junction intersecting the extending direction is not formed in the rib part 20.

The first connection portion 41 is an N$^+$-type in which the impurity concentration is higher than that of the first slab portion 31. The first connection portion 41 is disposed opposite to the first rib portion 21 with respect to the first slab portion 31, and is connected to the first slab portion 31. The second connection portion 42 is a P$^+$-type in which the impurity concentration is higher than that of the second slab portion 32. The second connection portion 42 is disposed opposite to the second rib portion 22 with respect to the second slab portion 32 and is connected to the second slab portion 32. In the present embodiment, the first and second connection portions 41 and 42 have the same length in the extending direction and the same thickness as those of the first and second slab portions 31 and 32.

The third connection portion 43 is a P$^+$-type in which the impurity concentration is higher than that of the third slab portion 33. The third connection portion 43 is disposed opposite to the first rib portion 21 with respect to the third slab portion 33, and is connected to the third slab portion 33. The fourth connection portion 44 is an N$^+$-type in which the impurity concentration is higher than that of the fourth slab portion 34. The fourth connection portion 44 is disposed opposite to the second rib portion 22 with respect to the fourth slab portion 34, and is connected to the fourth slab portion 34. In the present embodiment, the third and fourth connection portions 43 and 44 have the same length in the extending direction and the same thickness as those of the third and fourth slab portions 33 and 34.

The first contact portion 51 is an N$^{++}$-type in which the impurity concentration is higher than that of the first connection portion 41. The first contact portion 51 is disposed opposite to the first rib portion 21 with respect to the first connection portion 41, and is connected to the first connection portion 41. The second contact portion 52 is a P$^{++}$-type in which the impurity concentration is higher than that of the second connection portion 42. The second contact portion 52 is disposed opposite to the second rib portion 22 with respect to the second connection portion 42, and is connected to the second connection portion 42. The first and second contact portions 51 and 52 of the present embodiment have the same length as the first and second slab portions 31 and 32 in the extending direction. Further, the first and second contact portions 51 and 52 of the present embodiment have the same thickness as the rib part 20.

The third contact portion 53 is a P$^{++}$-type in which the impurity concentration is higher than that of the third connection portion 43. The third contact portion 53 is disposed opposite to the first rib portion 21 with respect to the third connection portion 43, and is connected to the third connection portion 43. The fourth contact portion 54 is an N++-type in which the impurity concentration is higher than that of the fourth connection portion 44. The fourth contact portion 54 is disposed opposite to the second rib portion 22 with respect to the fourth connection portion 44, and is connected to the fourth connection portion 44. The third and fourth contact portions 53 and 54 of the present embodiment have the same length as the third and fourth slab portions 33 and 34 in the extending direction. Further, the third and fourth contact portions 53 and 54 of the present embodiment have the same thickness as the rib part 20.

An interlayer insulating film 60 is disposed on the active layer 13. The interlayer insulating film 60 is formed with a first contact hole 61 that exposes the first contact portion 51 and a second contact hole 62 that exposes the second contact portion 52. The interlayer insulating film 60 is formed with a third contact hole 63 that exposes the third contact portion 53 and a fourth contact hole 64 that exposes the fourth contact portion 54.

A first electrode 71 and a second electrode 72 are formed on the interlayer insulating film 60. The first electrode 71 is connected to the first contact portion 51 through the first contact hole 61. The second electrode 72 is connected to the second contact portion 52 through the second contact hole 62. A third electrode 73 and a fourth electrode 74 are formed on the interlayer insulating film 60. The third electrode 73 is connected to the third contact portion 53 through the third contact hole 63. The fourth electrode 74 is connected to the fourth contact portion 54 through the fourth contact hole 64.

The optical phase modulator of the present embodiment has the configuration as described above. Next, an operation of the optical phase modulator will be described.

In the optical phase modulator of the present embodiment, light propagates mainly in the extending direction of the rib part 20. When the first and fourth electrodes 71 and 74 are applied with the voltage (that is, the reverse bias voltage) higher than that of the second and third electrodes 72 and 73, a depletion layer expands at the PN junction, and the carrier density decreases. At this time, in the present embodiment, the depletion layer expands at the PN junction between the first rib portion 21 and the second rib portion 22, the PN junction between the first rib portion 21 and the third slab portion 33, and the PN junction between the second rib portion 22 and the fourth slab portion 34. Therefore, the change in the effective refractive index of light can be increased. FIGS. 1 to 3 show a state in which the reverse bias voltage is applied. Thus, the voltage V+ and the voltage V− are shown as the state in which the voltage applied to the first and fourth electrodes 71 and 74 is higher than the voltage applied to the second and third electrodes 72 and 73. In the corresponding figures described later, the voltage V+ and the voltage V− are similarly shown.

In the present embodiment, the rib part 20 does not have a connection portion, within the first rib portion 21, that extends across the first rib portion 21 and connects to the second rib portion 22. Also, the rib part 20 does not have a connection portion, within the second rib portion 22, that extends across the second rib portion 22 and connects to the first rib portion 21. Therefore, an increase in modulation loss can be suppressed. Here, an optical phase modulator in which a rib part 20 has a PN junction along a direction intersecting the extending direction is assumed as an optical phase modulator of a comparative example. Specifically, in the optical phase modulator of the comparative example, the rib part 20 has a connection portion that extends across the first rib portion 21 and connects to the second rib portion 22 within the first rib portion 21 and a connection portion that extends across the second rib portion 22 and connects to the first rib portion 21 within the second rib portion 22.

In the phase modulator of the comparative example, as described above, since the carriers in each connection portion remain when the reverse bias voltage is applied to the PN junction, the modulation loss increases due to absorption of light by the remaining carriers. Therefore, the modulation loss increases as the number of interfaces, that is, the PN junctions intersecting the extending direction of the rib part 20 increases. On the other hand, in the optical phase modulator of the present embodiment, since the rib part 20 does not have the interface extending in the direction intersecting the extending direction, it is possible to suppress an increase in modulation loss due to the remaining carriers.

According to the present embodiment described above, the optical waveguide OW is configured so that the section including the PN junction and the section including the PNPN junction are alternately and repeatedly arranged in the extending direction, the sections being defined in cross-sections having the normal direction along the extending direction. For example, the rib part 20, the first slab portion 31 and the second slab portion 32 form a PN structure in a cross-section defined orthogonal to the extending direction, and the rib part 20, the third slab portion 33 and the fourth slab portion 34 form a PNPN structure in a cross-section defined orthogonal to the extending direction. Further, the PN structure and the PNPN structure are alternately arranged in the extending direction. Therefore, when the reverse bias voltage is applied, the depletion layer expands at the PN junction between the first rib portion 21 and the second rib portion 22, at the PN junction between the first rib portion 21 and the third slab portion 33, and at the PN junction between the second rib portion 22 and the fourth slab portion 34. As such, it is possible to suppress a decrease in the effective refractive index of light. Also, it is possible to suppress a decrease in the amount of change in phase.

Further, according to the present embodiment, the first rib portion 21 is electrically connected to the first slab portion 31 that is disposed on the opposite side to the second rib portion 22 across the first rib portion 21. The second rib portion 22 is electrically connected to the second slab portion 32 disposed on the opposite side to the first rib portion 21 across the second rib portion 22. Therefore, in the optical phase modulator of the present embodiment, the rib part 20 does not have the interface that intersects the extending direction. As such, it is possible to suppress an increase in modulation loss due to the remaining carriers.

(1) In the present embodiment, the first rib portion 21 and the first slab portion 31 are disposed symmetric with the second rib portion 22 and the second slab portion 32 with respect to the boundary surface between the first rib portion 21 and the second rib portion 22. Therefore, when the reverse bias voltage is applied to the PN junction, it is possible to suppress the expansion of the depletion layer from being biased between the first rib portion 21 and the second rib portion 22. Further, it is possible to suppress an increase in modulation loss.

(2) In the present embodiment, the third slab portion 33 and the fourth slab portion 34 are disposed symmetric with each other with respect to the boundary surface between the first rib portion 21 and the second rib portion 22. Therefore, when the reverse bias voltage is applied to the PN junction, it is possible to suppress the expansion of the depletion layer from being biased between the first rib portion 21 and the third slab portion 33 and between the second rib portion 22 and the fourth slab portion 34. Further, it is possible to suppress an increase in modulation loss.

(3) In the present embodiment, the lengths of the third slab portion 33 and the fourth slab portion 34 in the extending direction are longer than those of the first slab portion 31 and the second slab portion 32 in the extending direction. Therefore, as compared to a case where the lengths of the third slab portion 33 and the fourth slab portion 34 in the extending direction are shorter than those of the first slab portion 31 and the second slab portion 32, the region of the PN junction formed between the rib part 20 and the third slab portion 33 and the fourth slab portion 34 can be increased. As such, the effective refractive index of light can be increased, and the amount of change in phase can be increased.

Second Embodiment

A second embodiment will be described hereinafter with reference to FIGS. 4 and 5. The present embodiment is different from the first embodiment in that a separation region is arranged. The other configurations of the present embodiment are similar to those of the first embodiment, and therefore a description of the similar configurations will not be repeated.

Figure 4:
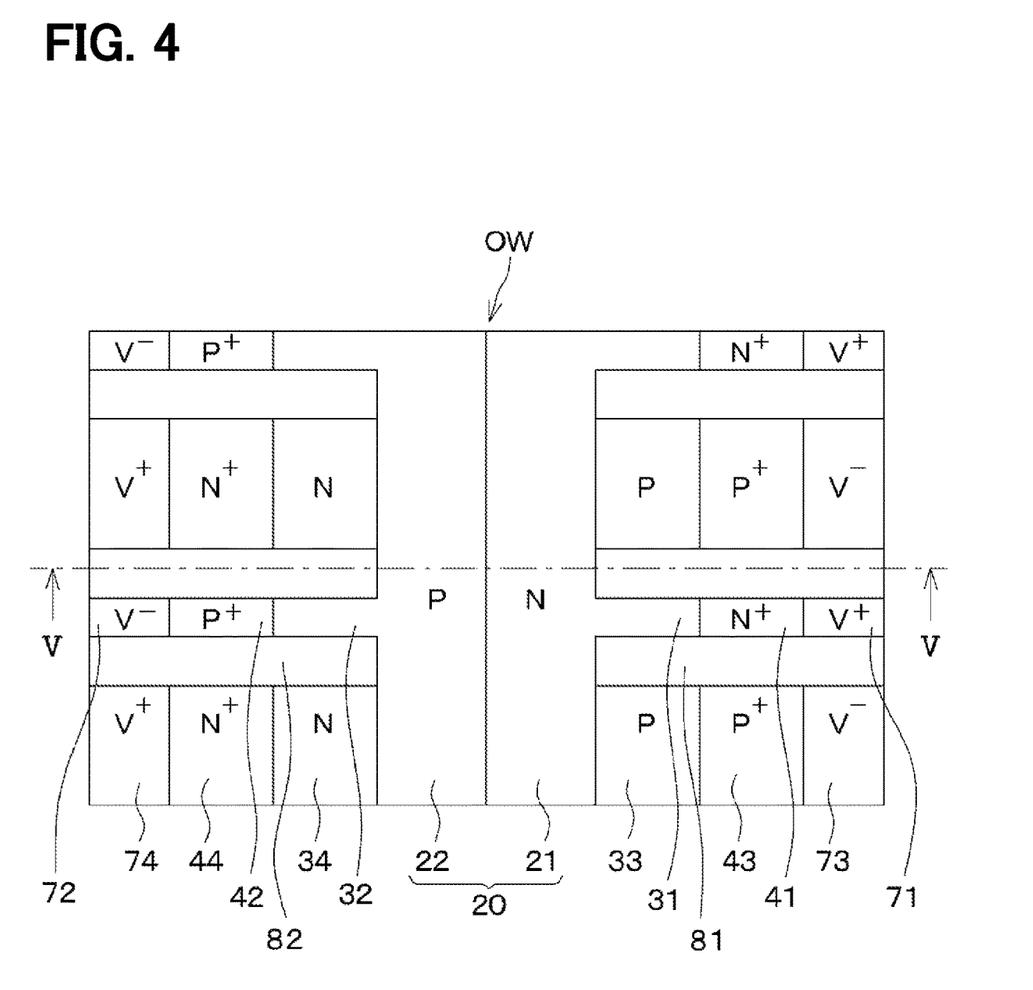
FIG. 4 is a plan view of an optical phase modulator according to a second embodiment.
Figure 5:
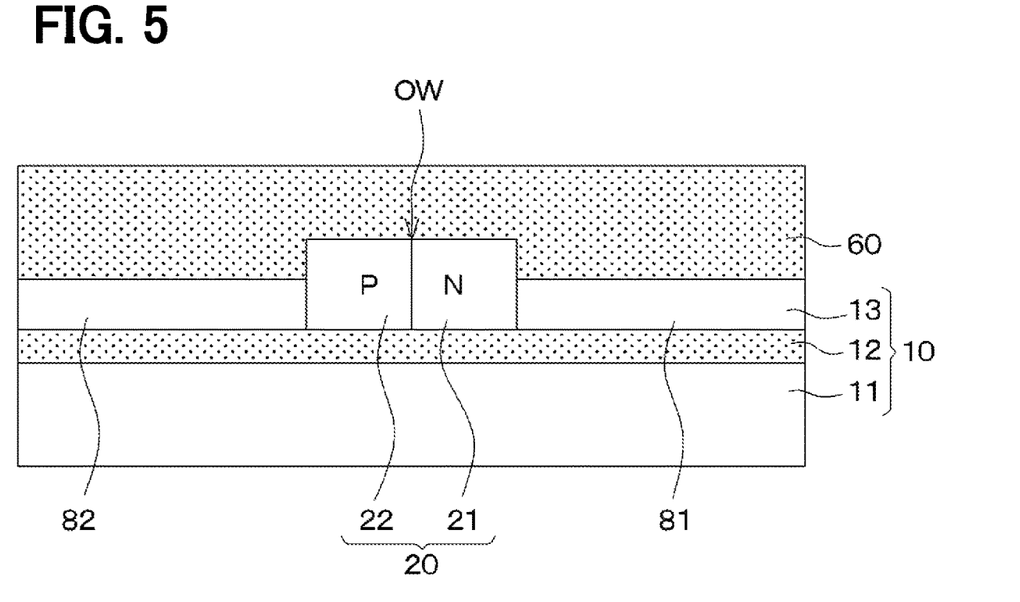
FIG. 5 is a cross-sectional view of the optical phase modulator taken along a line V-V in FIG. 4.

In the optical phase modulator of the present embodiment, as shown in FIGS. 4 and 5, a first undoped layer 81 is disposed between the first slab portion 31 and the third slab portion 33. The first undoped layer 81 is provided by the active layer 13 and is not doped with impurities. In the present embodiment, the first undoped layer 81 is disposed not only between the first slab portion 31 and the third slab portion 33 but also between the first connection portion 41 and the third connection portion 43 and between the first contact portion 51 and the third contact portion 53.

Further, a second undoped layer 82 is disposed between the second slab portion 32 and the fourth slab portion 34. The second undoped layer 82 is provided by the active layer 13 and not doped with impurities. In the present embodiment, the second undoped layer 82 is disposed not only between the second slab portion 32 and the fourth slab portion 34 but also between the second connection portion 42 and the fourth connection portion 44 and between the second contact portion 52 and the fourth contact portion 54. In the present embodiment, the first undoped layer 81 and the second undoped layer 82 correspond to the separation region.

According to the present embodiment described above, the optical waveguide OW has a configuration in which the section including the PN junction and the section including the PNPN junction are alternately and repeatedly arranged in the extending direction, the sections being defined in cross-sections having a normal direction along the extending direction. Therefore, the similar effects to those of the first embodiment can be achieved.

(1) In the optical phase modulator as in the present embodiment, the light propagates mainly through the rib part 20. In addition, the light also leaks to the first to fourth slab portions 31 to 34. In the present embodiment, the first undoped layer 81 is disposed between the first slab portion 31 and the third slab portion 33, and the second undoped layer 82 is disposed between the second slab portion 32 and the fourth slab portion 34. Therefore, the respective slab portions 31 to 34 do not have the PN junction therebetween. That is, in the first to fourth slab portions 31 to 34, the PN junction along a direction intersecting the extending direction is not formed. Therefore, the modulation loss can be further reduced. Since the PN junction is not formed between the slab portions 31 to 34, the capacitance that may be generated at the interface of the PN junction can be reduced, thereby improving the responsiveness.

Third Embodiment

A third embodiment will be described hereinafter with reference to FIG. 6. The present embodiment is different from the second embodiment in the configuration of the separation region. The other configurations of the present embodiment are similar to those of the second embodiment, and therefore a description of the similar configurations will not be repeated.

Figure 6:
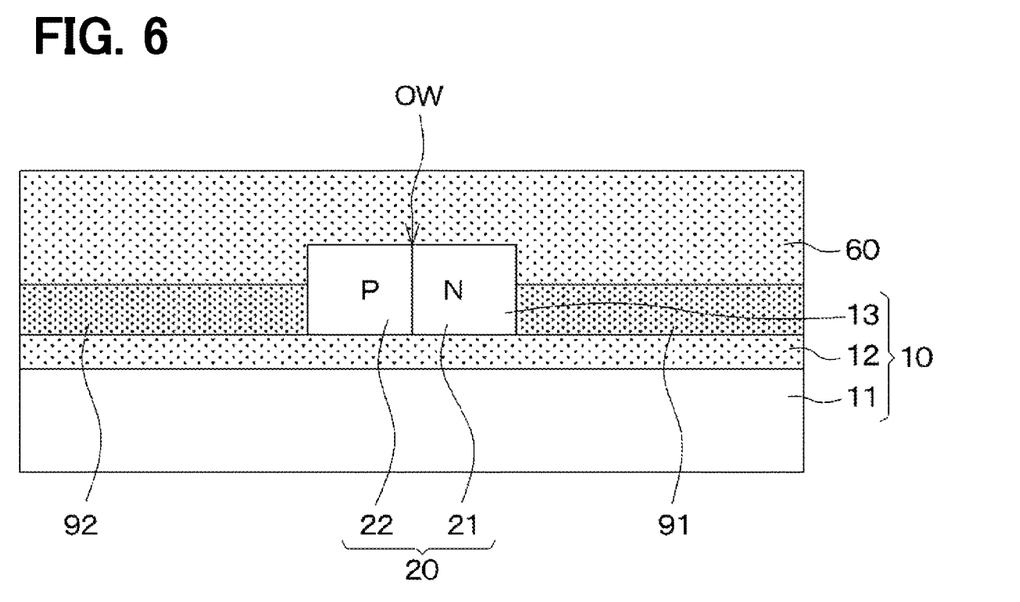
FIG. 6 is a cross-sectional view of an optical phase modulator according to a third embodiment.

As shown in FIG. 6, in the optical phase modulator of the present embodiment, as compared with the second embodiment, a first insulating film 91 is disposed in an area where the first undoped layer 81 of the second embodiment is disposed, and a second insulating film 92 is disposed in an area where the second undoped layer 82 of the second embodiment is disposed. That is, the optical phase modulator of the present embodiment has the first insulating film 91 and the second insulating film 92 in place of the first undoped layer 81 and the second undoped layer 82 of the second embodiment. FIG. 6 is a cross-sectional view corresponding to the line V-V in FIG. 4. In the present embodiment, the first insulating film 91 and the second insulating film 92 correspond to the separation region. Furthermore, the first insulating film 91 and the second insulating film 92 of the present embodiment are made of the same material as the interlayer insulating film 60.

The optical phase modulator of the present embodiment has the configurations as described above. Next, a method for manufacturing the respective portions 21, 22, 31 to 34, 41 to 44, and 51 to 54 of the active layer 13 in the optical phase modulator of the present embodiment will be described.

First, the semiconductor substrate 10 having the support substrate 11, the insulating film 12, and the active layer 13, which are sequentially stacked, is prepared. Next, using a mask, N-type impurities are ion-implanted into regions to form the first rib portion 21, the first slab portion 31, the fourth slab portion 34, the first connection portion 41, the fourth connection portion 44, the first contact portion 51, and the fourth contact portion 54. Also, using another mask, P-type impurities are ion-implanted into regions to form the second rib portion 22, the second slab portion 32, the third slab portion 33, the second connection portion 42, the third connection portion 43, the second contact portion 52, and the third contact portion 53.

Subsequently, etching is partially performed to reduce the thickness of the regions to be the first to fourth slab portions 31 to 34 and the first to fourth connection portions 41 to 44. Next, etching is performed to remove the active layer 13 from the regions where the first insulating film 91 and the second insulating film 92 are to be arranged. Thereafter, the first insulating film 91 and the second insulating film 92 are placed in the regions from which the active layer 13 has been removed. In the present embodiment, the first insulating film 91 and the second insulating film 92 are disposed in the same step, when the interlayer insulating film 60 is disposed on the active layer 13.

According to the present embodiment described above, the optical waveguide OW has a configuration in which the section including the PN junction and the section including the PNPN junction are alternately and repeatedly arranged in the extending direction, the sections being defined in cross-sections having the normal direction along the extending direction. Therefore, the similar effects to those of the first embodiment can be achieved.

(1) In the present embodiment, the separation region is provided by the first insulating film 91 and the second insulating film 92. The first insulating film 91 and the second insulating film 92 are placed after the active layer 13 is removed by etching. Therefore, it is possible to suppress variation in the length of the separation region in the extending direction, as compared with the case where the separation region is provided by the active layer 13. That is, when the separation region is provided by the first undoped layer 81 as in the second embodiment, the length of the separation region in the extending direction depends on the accuracy in forming the first slab portion 31 and the third slab portion 33. Similarly, when the separation region is provided by the second undoped layer 82, the length of the separation region in the extending direction depends on the accuracy in forming the second slab portion 32 and the fourth slab portion 34. That is, in the configuration of the second embodiment, two factors may affect the length of the separation region in the extending direction. In contrast, in the configuration of the present embodiment, the length of the separation region in the extending direction depends on the accuracy of etching performed for the placement of the first and second insulating films 91 and 92. That is, in the configuration of the present embodiment, one factor may affect the length of the separation region in the extending direction. Therefore, according to the present embodiment, it is possible to reduce the factors that affect the length of the separation region in the extending direction. As such, it is possible to suppress variations in the length of the separation region in the extending direction. Further, it is possible to suppress variations in the length of the first to fourth slab portions 31 to 34 in the extending direction. Accordingly, it is possible to suppress the amount of change in the phase.

Fourth Embodiment

A fourth embodiment will be described hereinafter with reference to FIGS. 7 to 9. In the present embodiment, a method of connecting the first electrode 71 through the fourth electrode 74 is defined, as compared with the first embodiment. The other configurations of the present embodiment are similar to those of the first embodiment, and therefore a description of the similar configurations will not be repeated.

Figure 7:
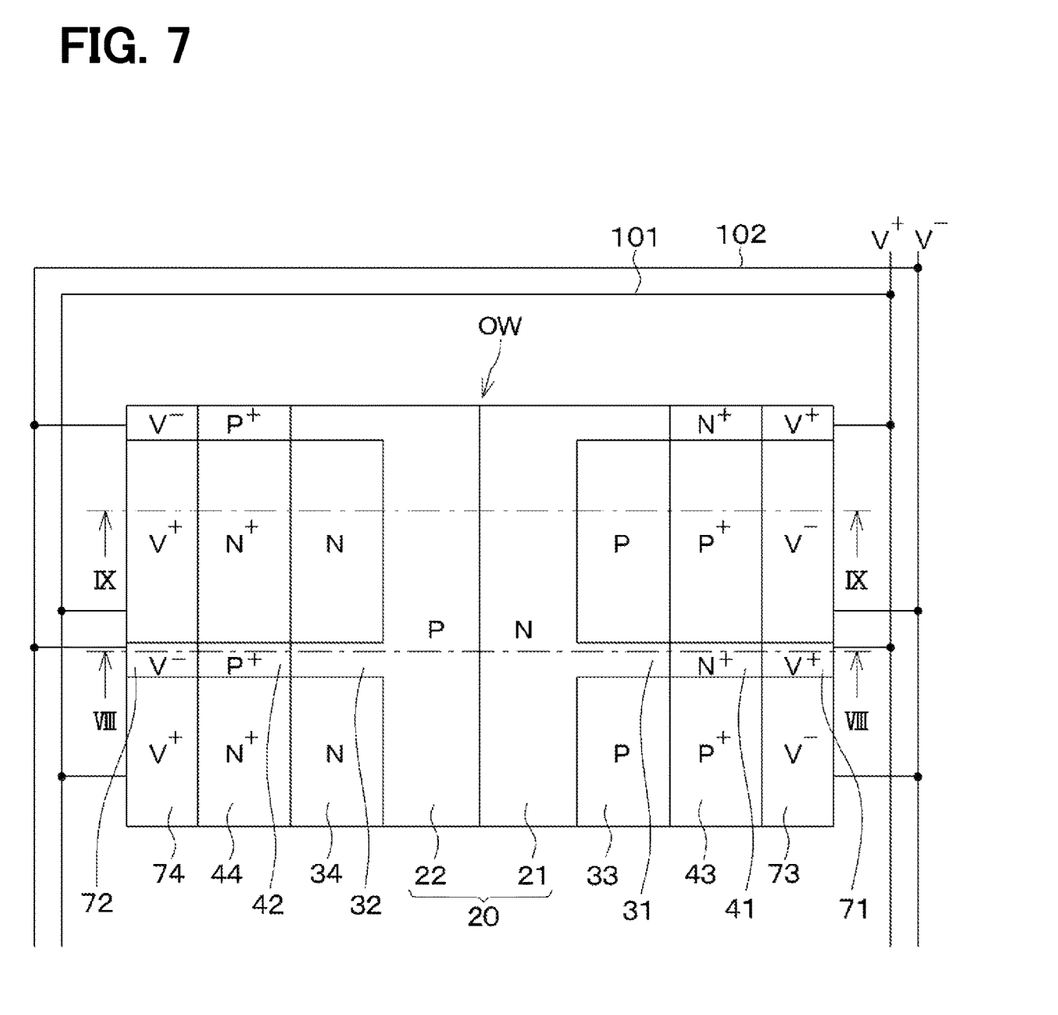
FIG. 7 is a plan view of an optical phase modulator according to a fourth embodiment.

In the optical phase modulator of the present embodiment, as shown in FIG. 7, the first electrode 71 and the fourth electrode 74 are connected to a common first wiring layer 101, and the second electrode 72 and the third electrode 73 are connected to a common second wiring layer 102.

Figure 8:
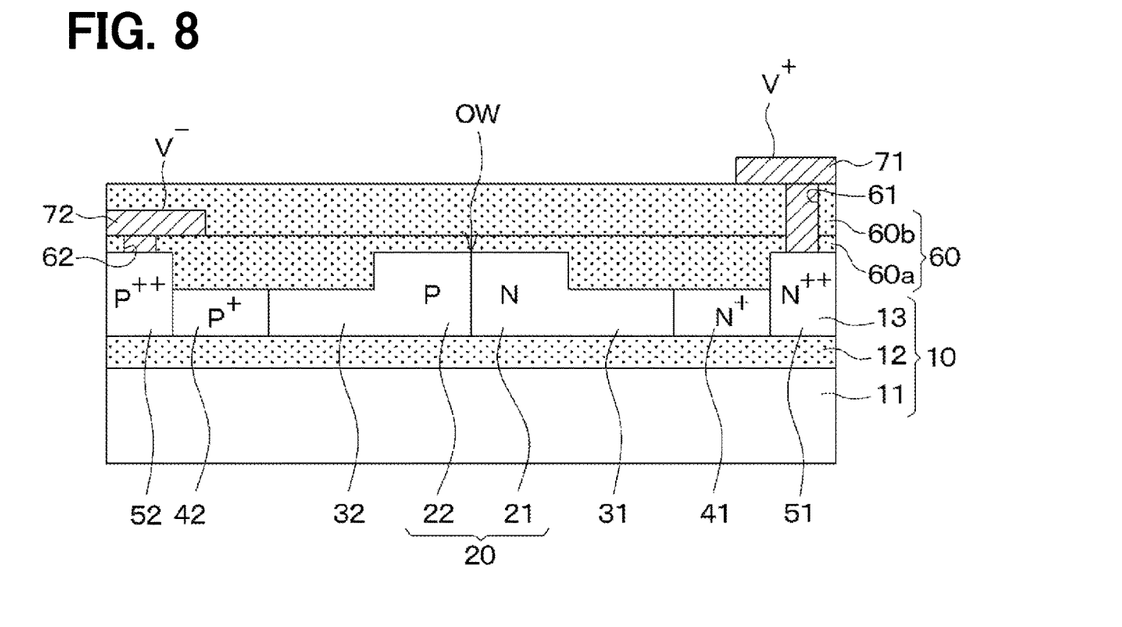
FIG. 8 is a cross-sectional view of the optical phase modulator taken along a line VIII-VIII in FIG. 7.
Figure 9:
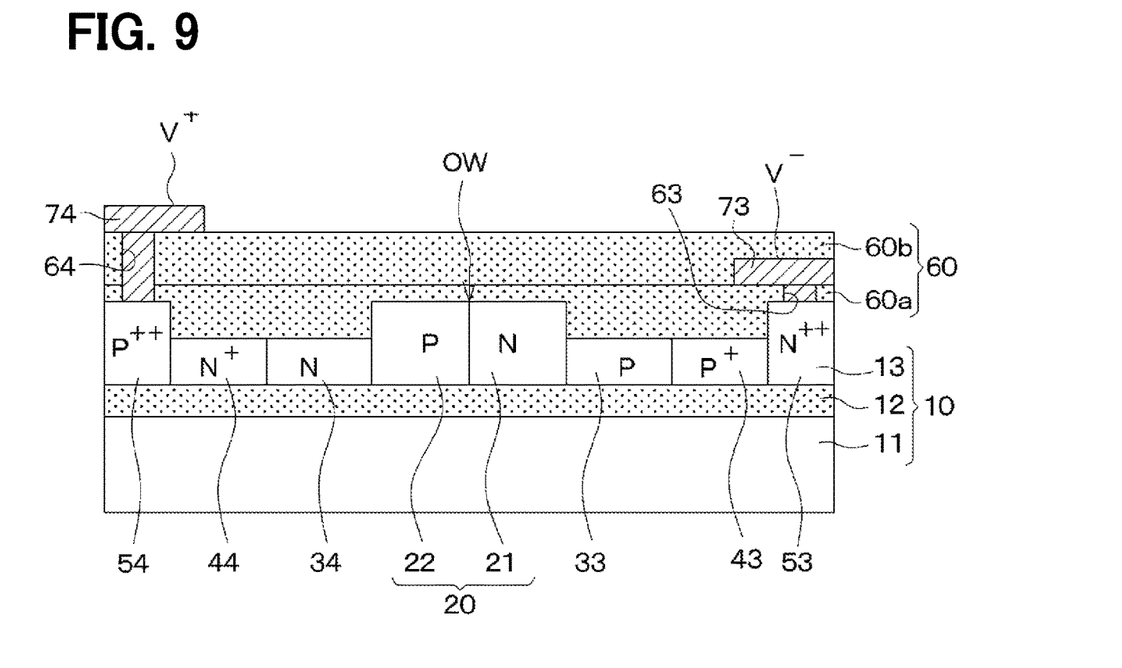
FIG. 9 is a cross-sectional view of the optical phase modulator taken along a line IX-IX in FIG. 7.

Specifically, as shown in FIGS. 8 and 9, the interlayer insulating film 60 includes a first interlayer insulating film 60a and a second interlayer insulating film 60b. The first interlayer insulating film 60a is stacked on the semiconductor substrate 10, and the second interlayer insulating film 60b is stacked on the first interlayer insulating film 60a. The first interlayer insulating film 60a and the second interlayer insulating film 60b are made of the same material. As shown in FIG. 8, the first interlayer insulating film 60a and the second interlayer insulating film 60b are formed with a first contact hole 61 that exposes the first contact portion 51. The first interlayer insulating film 60a is formed with a second contact hole 62 that exposes the second contact portion 52.

As shown in FIG. 9, the first interlayer insulating film 60a and the second interlayer insulating film 60b are formed with a fourth contact hole 64 that exposes the fourth contact portion 54. The first interlayer insulating film 60a is formed with a third contact hole 63 that exposes the third contact portion 53.

The second electrode 72 is disposed on the first interlayer insulating film 60a, and is connected to the second contact portion 52 through the second contact hole 62. The third electrode 73 is disposed on the first interlayer insulating film 60a, and is connected to the third contact portion 53 through the third contact hole 63. That is, the electrodes serving as the negative electrodes when the reverse bias voltage is applied to the PN junction are disposed on the first interlayer insulating film 60a.

The first electrode 71 is disposed on the second interlayer insulating film 60b, and is connected to the first contact portion 51 through the first contact hole 61. The fourth electrode 74 is disposed on the second interlayer insulating film 60b, and is connected to the fourth contact portion 54 through the fourth contact hole 64. That is, the electrodes serving as the positive electrodes when the reverse bias voltage is applied to the PN junction are disposed on the second interlayer insulating film 60b.

The second electrode 72 and the third electrode 73 are appropriately routed above the first interlayer insulating film 60a and are electrically connected to the same first wiring layer 101. Similarly, the first electrode 71 and the fourth electrode 74 are appropriately routed above the second interlayer insulating film 60b and electrically connected to the same second wiring layer 102.

According to the present embodiment described above, the optical waveguide OW has the configuration in which the section having the PN junction and the section having the PNPN junction are alternately and repeatedly arranged in the extending direction, the sections being defined in cross-sections having the normal direction along the extending direction. Therefore, the similar effects to those of the first embodiment can be achieved.

(1) In the present embodiment, the second electrode 72 and the third electrode 73 are electrically connected above the first interlayer insulating film 60a, and the first electrode 71 and the fourth electrode 74 are electrically connected above the second interlayer insulating film 60b. Therefore, it is possible to restrict the first and fourth electrodes 71 and 74 and the second and third electrodes 72 and 73 from interfering with each other. As such, it is possible to easily arrange the wiring.

Fifth Embodiment

A fifth embodiment will be described hereinafter with reference to FIG. 10. The present embodiment is different from the second embodiment in the impurity concentration of the first to fourth slab portions 31 to 34. The other configurations of the present embodiment are similar to those of the second embodiment, and therefore a description of the similar configurations will not be repeated.

Figure 10:
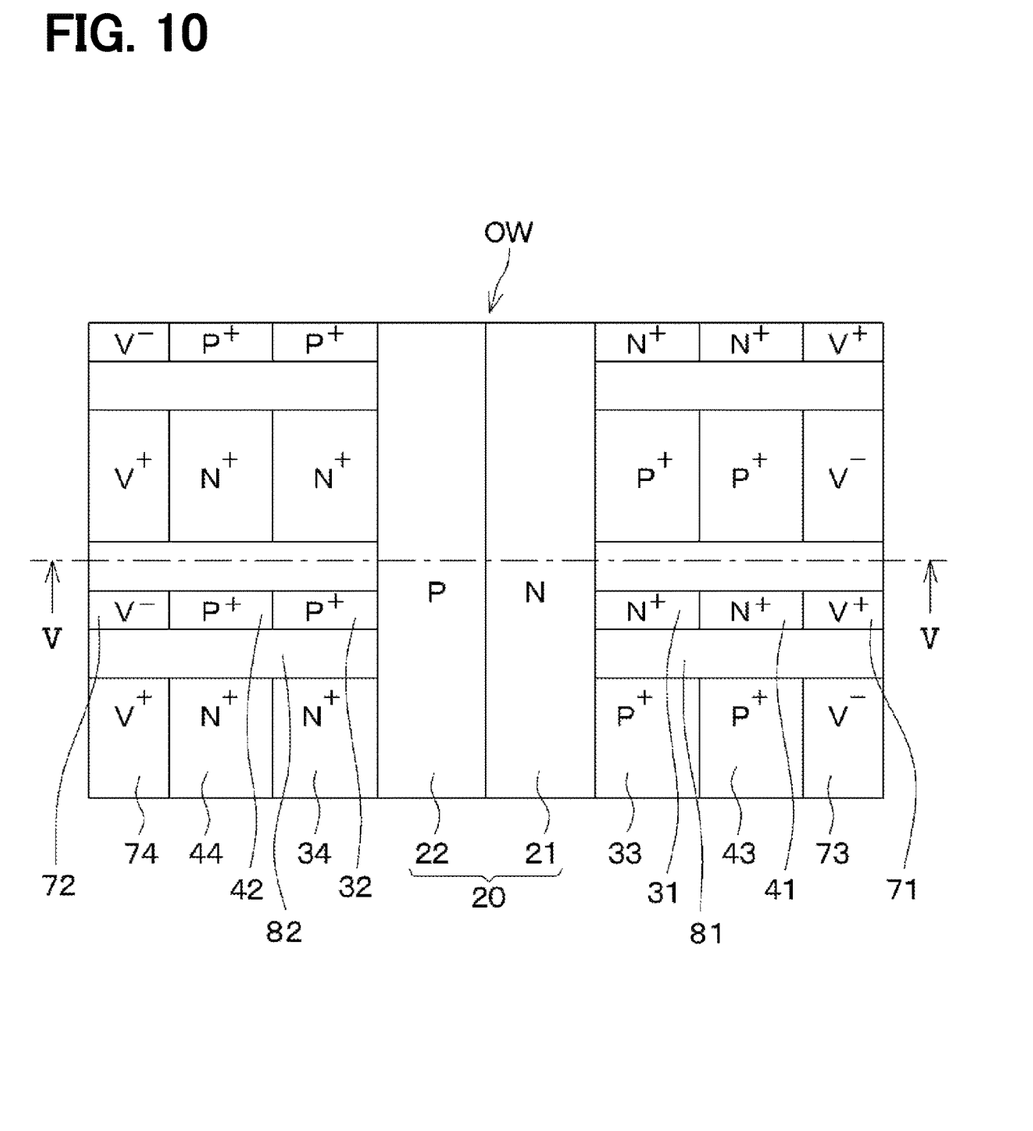
FIG. 10 is a plan view of an optical phase modulator according to a fifth embodiment.

In the present embodiment, as shown in FIG. 10, the first slab portion 31 and the fourth slab portion 34 are of the $N^+$ type in which the impurity concentration is higher than that of the first rib portion 21. Similarly, the second slab portion 32 and the third slab portion 33 are of the P+ type in which the impurity concentration is higher than that of the second rib portion 22.

According to the present embodiment described above, the optical waveguide OW has the configuration in which the section having the PN junction and the section having the PNPN junction are alternately and repeatedly arranged in the extending direction, the sections being defined in the cross-sections having the normal direction along the extending direction. Therefore, the similar effects to those of the first embodiment can be achieved.

(1) In the present embodiment, the first to fourth slab portions 31 to 34 have the impurity concentration higher than that of the first and second rib portions 21 and 22. Therefore, when the reverse bias voltage is applied, carriers in the rib part 20 can be easily extracted, and the amount of change in the phase can be improved.

OTHER EMBODIMENTS

Although the present disclosure has been described in accordance with the embodiments, it is understood that the present disclosure is not limited to such embodiments or structures. The present disclosure encompasses various modifications and variations within the scope of equivalents. In addition, various combinations, and configurations, as well as other combinations and configurations that include only one element, more, or less, are within the scope and spirit of the present disclosure.

For example, in each of the embodiments described above, the first rib portion 21 and first slab portion 31 and the second rib portion 22 and second slab portion 32 may not be formed symmetric with each other respect to the boundary surface between the first rib portion 21 and the second rib portion 22. Similarly, the third slab portion 33 and the fourth slab portion 34 may not be formed symmetric with each other with respect to the boundary surface between the first rib portion 21 and the second rib portion 22. Furthermore, the lengths of the third slab portion 33 and the fourth slab portion 34 in the extending direction may not be longer than those of the first slab portion 31 and the second slab portion 32. Also in such an optical phase modulator, the optical waveguide OW has the configuration in which the section having the PN junction and the section having the PNPN junction are alternately and repeatedly arranged in the extending direction, the sections being defined in the cross-sections having the normal direction along the extending direction. Therefore, the similar effects to those of the first embodiment can be achieved.

In the third embodiment described above, the manufacturing processes of the respective portions 21, 22, 31 to 34, 41 to 44, and 51 to 54 of the active layer 13 can be appropriately changed. For example, the etching for forming the regions where the first and second insulating films 91 and 92 are to be placed may be performed after the etching for reducing the thickness of the portions to be formed as the first to fourth slab portions 31 to 34 and the first to fourth connection portions 41 to 44. Next, the respective portions 21, 22, 31 to 34, 41 to 44, and 51 to 55 may be formed by ion implantation of an N-type impurity and a P-type impurity, and then the first and second insulating films 91 and 92 may be disposed.

Further, in the fourth embodiment described above, the first and fourth electrodes 71 and 74 may be disposed above the first interlayer insulating film 60a, and the second and third electrodes 72 and 73 may be disposed above the second interlayer insulating film 60b.

The embodiments described above may be combined as appropriate. For example, the fourth embodiment may be combined with the second or third embodiment, so that the first and fourth electrodes 71 and 74 are connected to the common first wiring layer 101, and the second and third electrodes 72 and 73 are connected to the common second wiring layer 102. The fifth embodiment may be combined with the first, third, or fourth embodiment, so that the first to fourth slab portions 31 to 34 have the impurity concentration higher than that of the first and second rib portions 21 and 22.

Summarizing the embodiments and modifications described above, as a first technical idea, an optical phase modulator includes: a rib part and first to fourth slab portions. The rib part extends in an extending direction, and includes a first rib portion of an N-type and a second rib portion of a P-type. The first rib portion and the second rib portion are arranged in a width direction that intersects the extending direction and a thickness direction of the rib part, and provides a PN junction therebetween along the extending direction. The first slab portion is the N type and has a thickness smaller than a thickness of the rib part. The first slab portion is disposed opposite to the second rib portion with respect to the first rib portion in the width direction, and connected to the first rib portion. The second slab portion is the P-type and has a thickness smaller than the thickness of the rib part. The second slab portion is disposed opposite to the first rib portion with respect to the second rib portion in the width direction, and connected to the second rib portion. The third slab portion is the P-type and has a thickness smaller than the thickness of the rib part. The third slab portion is disposed opposite to the second rib portion with respect to the first rib portion in the width direction, and connected to the first rib portion. The fourth slab portion is the N-type and has a thickness smaller than the thickness of the rib part. The fourth slab portion is disposed opposite to the first rib portion with respect to the second rib portion in the width direction, and connected to the second rib portion. Further, the rib part, the first slab portion and the second slab portion provide a PN structure in a cross-section having a normal direction along the extending direction. The rib part, the third slab portion and the fourth slab portion provide a PNPN structure in a cross-section having a normal direction along the extending direction. The PN structure and the PNPN structure are alternately arranged in the extending direction.

As a second technical idea, in the optical modulator according to the first technical idea, the first rib portion and the first slab portion may be arranged symmetrically with the second rib portion and the second slab portion with respect to an interface between the first rib portion and the second rib portion as a reference.

As a third technical idea, in the optical modulator according to the first or second technical idea, the first rib portion and the third slab portion may be arranged symmetrically with the second rib portion and the fourth slab portion with respect to the interface between the first rib portion and the second rib portion as the reference. As a fourth technical idea, in the optical modulator according to any one of the first to third technical ideas, the third slab portion and the fourth slab portion may be longer than the first slab portion and the second slab portion in the extending direction.

As a fifth technical idea, the optical phase modulator according to any one of the first to fourth technical ideas may further include a first separation region that is undoped with impurities and disposed between the first slab portion and the third slab portion, and a second separation region that is undoped with impurities and disposed between the second slab portion and the fourth slab portion. As a sixth technical idea, the optical phase modulator according to the fifth technical idea may further include a semiconductor substrate that has a support substrate, an insulating film disposed on the support substrate, and an active layer disposed on the insulating film. The rib part and the first to fourth slab portions may be provided by the active layer, and the first and second separation regions may be provided by the insulating film.

As a seventh technical idea, the optical phase modulator according to any one of the first to sixth technical ideas may further includes an interlayer insulating film covering the rib part and the first to fourth slab portions; a first electrode connected to the first slab portion of the N-type; a second electrode connected to the second slab portion of the P-type; a third electrode connected to the third slab portion of the P-type; and a fourth electrode connected to the fourth slab portion of the N-type. The interlayer insulating film may include a first interlayer insulating film and a second interlayer insulating film stacked on the first interlayer insulating film. The first electrode and the fourth electrode may be disposed on one of the first interlayer insulating film and the second interlayer insulating film and connected to each other. The second electrode and the third electrode may be disposed on the other of the first interlayer insulating film and the second interlayer insulating film and connected to each other.

What is claimed is:

1. An optical phase modulator comprising:
   a rib part extending in an extending direction, the rib part including a first rib portion of an N-type and a second rib portion of a P-type, the first rib portion and the second rib portion being arranged in a width direction that intersects the extending direction and a thickness direction of the rib part, the first rib portion and the second rib portion providing a PN junction therebetween along the extending direction;
   a first slab portion being the N-type and having a thickness smaller than a thickness of the rib part, the first slab portion being disposed opposite to the second rib portion with respect to the first rib portion in the width direction, and connected to the first rib portion;
   a second slab portion being the P-type and having a thickness smaller than the thickness of the rib part, the second slab portion being disposed opposite to the first rib portion with respect to the second rib portion in the width direction, and connected to the second rib portion;
   a third slab portion being the P-type and having a thickness smaller than the thickness of the rib part, the third slab portion being disposed opposite to the second rib portion with respect to the first rib portion in the width direction, and connected to the first rib portion; and
   a fourth slab portion being the N-type and having a thickness smaller than the thickness of the rib part, the fourth slab portion being disposed opposite to the first rib portion with respect to the second rib portion in the width direction, and connected to the second rib portion, wherein
   the rib part, the first slab portion and the second slab portion provide a PN structure in a cross-section having a normal direction along the extending direction,
   the rib part, the third slab portion and the fourth slab portion provide a PNPN structure in a cross-section having a normal direction along the extending direction, and
   the PN structure and the PNPN structure are alternately disposed in the extending direction.

2. The optical phase modulator according to claim 1, wherein
   the first rib portion and the first slab portion are disposed symmetrically with the second rib portion and the second slab portion with respect to an interface between the first rib portion and the second rib portion as a reference.

3. The optical phase modulator according to claim 2, wherein
   the first rib portion and the third slab portion are disposed symmetrically with the second rib portion and the fourth slab portion with respect to the interface between the first rib portion and the second rib portion as the reference.

4. The optical phase modulator according to claim 1, wherein
   the third slab portion and the fourth slab portion are longer than the first slab portion and the second slab portion in the extending direction.

5. The optical phase modulator according to claim 1, further comprising:
   a first separation region that is undoped with impurities and disposed between the first slab portion and the third slab portion; and
   a second separation region that is undoped with impurities and disposed between the second slab portion and the fourth slab portion.

6. The optical phase modulator according to claim 5, further comprising:
   a semiconductor substrate including a support substrate, an insulating film disposed on the support substrate, and an active layer disposed on the insulating film, wherein
   the rib part and the first to fourth slab portions are provided by the active layer, and
   the first and second separation regions are provided by the insulating film.

7. The optical phase modulator according to claim 1, further comprising:
   an interlayer insulating film covering the rib part and the first to fourth slab portions;
   a first electrode connected to the first slab portion of the N-type;
   a second electrode connected to the second slab portion of the P-type;
   a third electrode connected to the third slab portion of the P-type; and
   a fourth electrode connected to the fourth slab portion of the N-type, wherein
   the interlayer insulating film includes a first interlayer insulating film and a second interlayer insulating film stacked on the first interlayer insulating film,
   the first electrode and the fourth electrode are disposed on one of the first interlayer insulating film and the second interlayer insulating film, and are connected to each other, and
   the second electrode and the third electrode are disposed on the other of the first interlayer insulating film and the second interlayer insulating film, and are connected to each other.

* * * * *